US008375010B2

(12) United States Patent
Banister et al.

(10) Patent No.: US 8,375,010 B2
(45) Date of Patent: Feb. 12, 2013

(54) METHOD OF INTEGRATING APPLICATIONS WITH A NETWORK SERVICE APPLICATION BY CREATING NEW RECORDS IN A RELATIONSHIP FIELD

(76) Inventors: Richard Banister, Fremont, CA (US); Thomas Edgar Hawkes, Pacifica, CA (US)

( * ) Notice: Subject to any disclaimer, the term of this patent is extended or adjusted under 35 U.S.C. 154(b) by 61 days.

(21) Appl. No.: 12/890,587

(22) Filed: Sep. 24, 2010

(65) Prior Publication Data

US 2011/0082890 A1 Apr. 7, 2011

Related U.S. Application Data

(63) Continuation of application No. 11/897,239, filed on Aug. 29, 2007, now Pat. No. 8,122,040.

(51) Int. Cl.
*G06F 17/30* (2006.01)
(52) U.S. Cl. ............... 707/694; 707/792; 707/999.2
(58) Field of Classification Search .......... None
See application file for complete search history.

(56) References Cited

U.S. PATENT DOCUMENTS

| 7,464,373 | B1 * | 12/2008 | Yunt et al. ............... 717/125 |
| 7,774,172 | B1 * | 8/2010 | Yunt et al. ............... 703/2 |
| 2003/0088536 | A1 * | 5/2003 | Behnia ............... 707/1 |
| 2006/0136465 | A1 * | 6/2006 | Crim et al. ............... 707/102 |
| 2007/0124276 | A1 * | 5/2007 | Weissman et al. ............... 707/2 |
| 2007/0239798 | A1 * | 10/2007 | Shringi et al. ............... 707/201 |
| 2008/0028293 | A1 * | 1/2008 | Seliutin et al. ............... 715/234 |
| 2009/0043790 | A1 * | 2/2009 | Holster ............... 707/100 |

* cited by examiner

*Primary Examiner* — Anteneh Girma
(74) *Attorney, Agent, or Firm* — Patrick Reilly

(57) ABSTRACT

A computer-implemented method for integrating applications with a network service application is provided. A database management system automatically updates a local database of a computer with information contained within a remote database and an application is enabled to generate a new record in the local database with temporary values in the relationship fields such that the child records are logically related to one or more parent records by virtue of having the same relationship values. A new record is created by the web service for the parent record. When a changed value of the parent record's key is detected, a value of the key of relevant changed parent record is written into one or more local related record's relationship field.

5 Claims, 6 Drawing Sheets

METHOD OF INTEGRATING APPLICATIONS WITH A NETWORK SERVICE APPLICATION BY CREATING NEW RECORDS IN A RELATIONSHIP FIELD

CO-PENDING US NONPROVISIONAL PATENT APPLICATIONS

The present patent application is a Continuation of the U.S. Nonprovisional patent application Ser. No. 11/897,239 titled BI-DIRECTIONAL REPLICATION BETWEEN WEB-SERVICES AND RELATIONAL DATABASES filed on Aug. 29, 2007 now U.S. Pat. No. 8,122,040 by inventors Banister, R. and Hawkes, T. E. This co-pending U.S. Nonprovisional patent application having Ser. No. 11/897,239 is hereby incorporated in their entirety and for all purposes in the present Continuation patent application. The present Continuation patent application claims benefit of the priority date of Aug. 29, 2007 of the co-pending U.S. Nonprovisional patent application Ser. No. 11/897,239.

FIELD OF THE INVENTION

The present invention relates to information technology systems that maintain databases and enable searches for information contained within the database. The present invention more particularly relates to enabling the management by an information technology system of a federated or distributed database.

BACKGROUND OF THE INVENTION

Service Oriented Architecture Protocol, or "SOAP", has become a very important technology in the world economy. Also known as web services, SOAP architecture provides a standardized method of data exchange. The prior art fails to optimally resolve certain fundamental problems in using SOAP, such as (1.) reporting massive amounts of data within distributed or federated database systems; and (2.) integrating reported data with other applications. The transition to web services of portions of an enterprise's information technology systems makes it all the more important to be able to provide information to a relational database. Various integration processes are not only easier to implement with relational technology, they may not be possible without having all the data in one place in a relational database. Finally, reporting of massive amounts of data, especially if it is necessary to link it in the reporting system to other relational data sources, requires the speed and data merging abilities of a relational database.

The related art includes U.S. Pat. No. 7,222,130 that discloses a report then query capability for a multidimensional database model; U.S. Pat. No. 7,139,766 that describes a universal drill-down system for coordinated presentation of items in different databases; U.S. Pat. No. 7,254,590 that teaches set-oriented real-time data processing based on transaction boundaries; and U.S. Pat. No. 6,850,947 that presents a method and apparatus with data partitioning and parallel processing for transporting data for data warehousing applications.

The related art also includes U.S. Patent Application Publication No. 20070174296 that discloses a method and system for distributing a database and computer program within a network; U.S. Patent Application Publican No. 20070143747 that presents a customer relationship management system and method having code reuse; U.S. Patent Application Publican No. 20070130137 that teaches methods and systems for optimizing text searches over structured data in a multi-tenant environment; U.S. Patent Application Publican No. 20070106674 that discloses field sales process facilitation systems and methods; U.S. Patent Application Publican No. 20070027746 that presents a method and system for online sales information exchange; U.S. Patent Application Publican No. 20060161550 that describes a system and method for distributing customer relationship management information; U.S. Patent Application Publican No. 20060116896 that teaches a ser-maintained contact information data system; U.S. Patent Application Publican No. 20060101474 that discloses a system, method and apparatus for an extensible distributed enterprise integration platform; U.S. Patent Application Publican No. 20050283478 that presents SOAP-based Web services in a multi-tenant database system; U.S. Patent Application Publican No. 20050223022 that describes custom entities and fields in a multi-tenant database system; U.S. Patent Application Publican No. 20050154742 that teaches a business software application generation system and method; U.S. Patent Application Publican No. 20050065925 that discloses a query optimization in a multi-tenant database system; and U.S. Patent Application Publican No. 20040002893 that describes a system and method for customer relationship management.

Each and every prior art document mentioned in this disclosure, to include U.S. Pat. Nos. 7,222,130; 7,139,766; 7,254,590; and 6,850,947, and U.S. Patent Application Publican Nos. 20070174296; 20070143747; 20070130137; 20070106674; 20070027746; 20060161550; 20060116896; 20060101474; 20050283478; 20050223022; 20050154742; 20050065925; and 20040002893, are incorporated by reference with this application in their entirety and for all purposes.

OBJECTS OF THE INVENTION

It is therefore an object of the method of the present invention enable to accurately and efficiently transferring information within a distributed or federated database.

It is a further object of certain alternate preferred embodiments of the method of the present invention to manage the communication of content of a web service to a locally stored and accessible relational database.

It is a further object of certain yet alternate preferred embodiments of the method of the present invention to make additions, changes, or deletions, and copy changes made to information stored in a locally stored or accessible database to other database resources of an Internet web service and/or within a distributed or federated database.

It is a further object of certain still alternate preferred embodiments of the method of the present invention to make additions, changes, or deletions, and copy changes made to information stored in a locally accessible database to a web service database or application.

SUMMARY OF THE INVENTION

Towards this object and other objects that will be made obvious in light of this disclosure, a first preferred embodiment of the method of the present invention (hereafter "first method") provides a computer implemented method for loading data from a remote web service via an electronic communications network into a relational database of a computer of the network. The first method may include one or more of the following aspects of (a) associating a data structure stored in the database with a source record type of the remote service; (b) initiating a first query, the first query requesting notice of changes to the source record within a first time period; (c) transmitting the first query to the remote service; (d) receiving a set of records by the computer from the remote web service, the first set of records comprising a notice of changes to the records that occurred within the first time period; and (e) updating the data content with the first set of records, whereby the restriction of the first time period limited the computational and communications load placed on the remote service and the network in responding to the first query and thereby reducing the likelihood of a timing out or unsuccessful query attempt.

Another alternate preferred embodiment of the method of the present invention (hereafter "second method") provides a computer implemented method for generating foreign key indexes by accessing the metadata of a remote web service of a electronic communications network. The second method may include one or more of the following aspects of (a) downloading a plurality of records from the remote database to a computer, the plurality of records comprising metadata related to foreign key pointers; and (b) building an index, the index comprising a foreign key and an address of a memory location wherein a record comprising the foreign key is stored in the computer.

Yet another alternate preferred embodiment of the method of the present invention (hereafter "third method") provides a computer implemented method for integrating applications with a network service application of an electronic communications network having a DBMS. The third method may include one or more of the following aspects of (a) applying a DBMS to automatically update a local database of a computer with information contained within a remote database; (b) assigning a local key to each primary key of each local record of the local database; and (c) writing the local key associated with each primary key into each local record comprising the primary key as a foreign key.

The foregoing and other objects, features and advantages will be apparent from the following description of the preferred embodiment of the invention as illustrated in the accompanying drawings.

BRIEF DESCRIPTION OF THE DRAWINGS

These, and further features of the invention, may be better understood with reference to the accompanying specification and drawings depicting the preferred embodiment, in which.

DETAILED DESCRIPTION OF A PREFERRED EMBODIMENT

In describing the preferred embodiments, certain terminology will be utilized for the sake of clarity. Such terminology is intended to encompass the recited embodiment, as well as all technical equivalents, which operate in a similar manner for a similar purpose to achieve a similar result.

Figure 1:
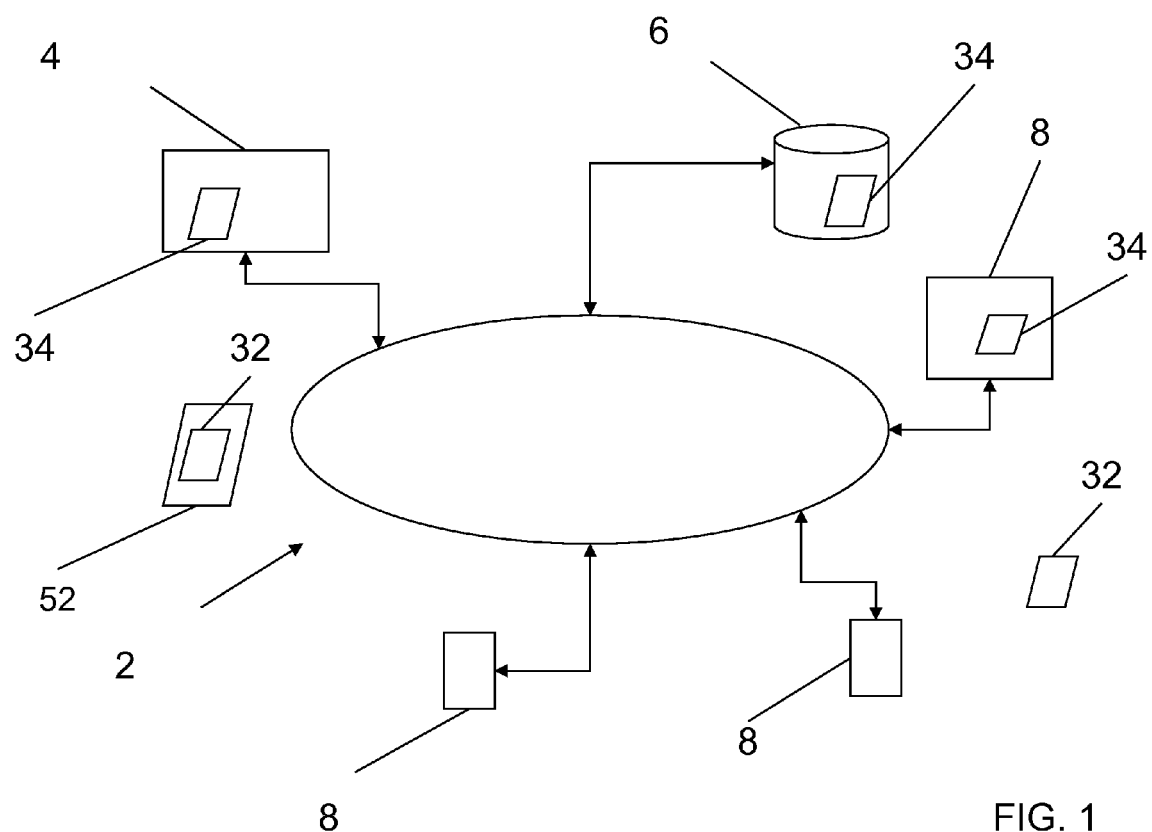
FIG. 1 is a schematic of an information technology network through which the first method may be practiced.

Referring now generally to the Figures and particularly to FIG. 1, FIG. 1 is a schematic drawing of an electronics communications network 2 that includes a computational system 4 (hereafter "computer" 4) providing a software database function. The electronics communications network 2 (hereafter "network" 2) includes a plurality of database systems 6 and computer workstations 8. The computer 4, the database systems 6, and the computer workstations 8 may comprise, or be comprised within, (1.) a personal computer configured for running WINDOWS XP™ operating system marketed by Microsoft Corporation of Redmond, Wash., (2.) a computer workstation configured to run, and running, a LINUX or UNIX operating system, and/or (3.) other suitable computational system known in the art configured for software database management and accessibility. In particular, the computer 4 may be a computer system, such as (a.) a VAIO FS8900 (™) notebook computer marketed by Sony Corporation of America, of New York City, N.Y., (b.) a Powerbook G4 (™) laptop personal computer marketed by Apple Computer of Cupertino, Calif.; or (c.) other suitable computational system known in the art, and configured for wireless and/or landline connectivity with the Internet and/or the World Wide Web. In addition, the computer 4, one or more workstations 8, and one or more database systems 6 may be or comprise (1.) a SUN SPARCSERVER computer workstation marketed by Sun Microsystems of Santa Clara, Calif. running LINUX or UNIX operating system; (2.) a personal computer configured for running WINDOWS XP™ operating system marketed by Microsoft Corporation of Redmond, Wash.; or (3.) a personal computer configured for running MAC OS 10 (™) operating system as marketed by Apple Computer of Cupertino, Calif.

In certain alternate preferred embodiments of the method of the present invention the network 2 may be or comprise a wireless telephone network and the computer 4 may comprise a wireless personal digital assistant or a cellular telephone, such as (1.) a Nokia Model E61 (™) cellular telephone marketed by Nokia Corporation of Espoo, Finland; or (2.) a BLACKBERRY (™) wireless personal digital assistant marketed by Research-in-Motion of Waterloo, Ontario, Canada.

Figure 2:
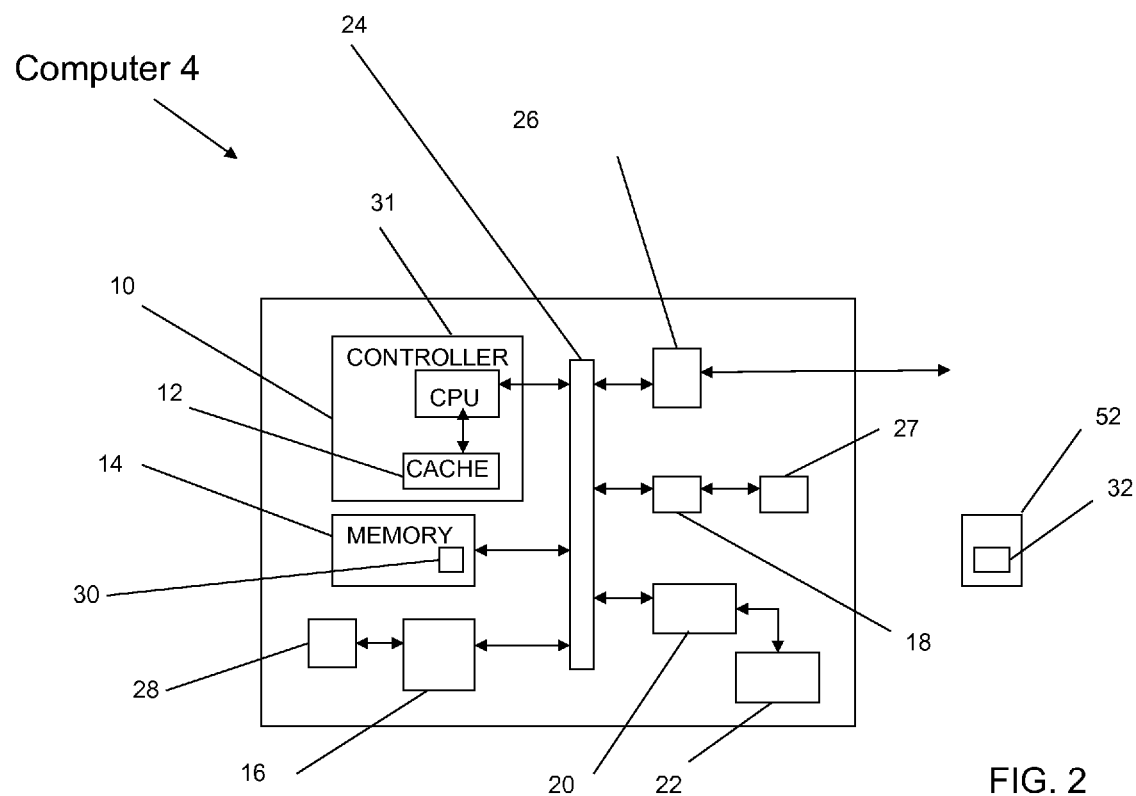
FIG. 2 is a schematic of an information technology system, e.g., a computer, through which the first method may be practiced.

Referring now generally to the Figures and particularly to FIG. 2, FIG. 2 is a schematic drawing of the computer 4 of the network 2. The computer 4 includes a central processing unit 10 (hereafter "CPU" 10), a cache memory of the CPU 12, a system memory 14, a data input device interface 16, a display device interface 18, an optional media reader interface 20, an optional media writer/reader 22, an internal communications bus 24, and a network communications interface 26. The network communications interface 26 may bi-directionally communicatively couple the computer 4 to the network 2 and/or a wireless telephony network comprised within the network 2. The CPU 10, the system memory 14, the data input device 16, the display device interface 18, the optional media reader interface 20, and the network interface 26 are communicatively coupled by means of the internal communications bus 24. The network communications interface 26 communicatively couples the computer 4 with the network 2 via the CPU 10 and the internal communications bus 24. The optional media reader interface 20 communicatively couples the media writer/reader 22 with the CPU 10 and the system memory 14 by means of the internal communications bus 24. The display device 18 interface communicatively couples a display device 27, e.g., a liquid crystal display device, to the CPU 10 via the internal communications bus 24. The data input device interface 16 communicatively couples an input device, such as a keyboard and computer mouse module 28 with the CPU 10 via the internal communications bus 24. The system memory 14 stores a system software 30 of the computer 4. The CPU 10 and the cache memory may be comprised within a unified controller 31.

The media writer/reader 22 is configured to read a computer-readable and machine executable instructions stored within a computer-readable medium 32 and transmit the read instructions to the CPU 10 and the system memory 14. The terms "computer-readable medium" and "computer-readable media" 32 as used herein refer to any suitable medium known in the art that participates in providing instructions to the network and/or the computer. Such a medium may take many forms, including but not limited to, non-volatile media, volatile media, and transmission media. Non-volatile media includes, for example, optical or magnetic disks, such as may be comprised within the system memory.

Volatile media includes dynamic memory. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer system can read.

Various forms of computer-readable media 32 may be involved in carrying one or more sequences of one or more instructions to the network for execution. For example, the instructions may initially be carried on a magnetic disk of a remote server. The remote server can load the instructions into its dynamic memory and send the instructions over a telephone line using a modem. A modem local to or communicatively linked with the network can receive the data on the telephone line and use an infra-red transmitter to convert the data to an infra-red signal. An infrared detector can receive the data carried in the infrared signal and appropriate circuitry can provide the data to the network.

It is understood that the workstations 8 and database systems 6 of the network may comprise some or all of the aspects and elements of the computer 4 disclosed herein optionally along with additional suitable aspects and elements known in the art.

Figure 3:
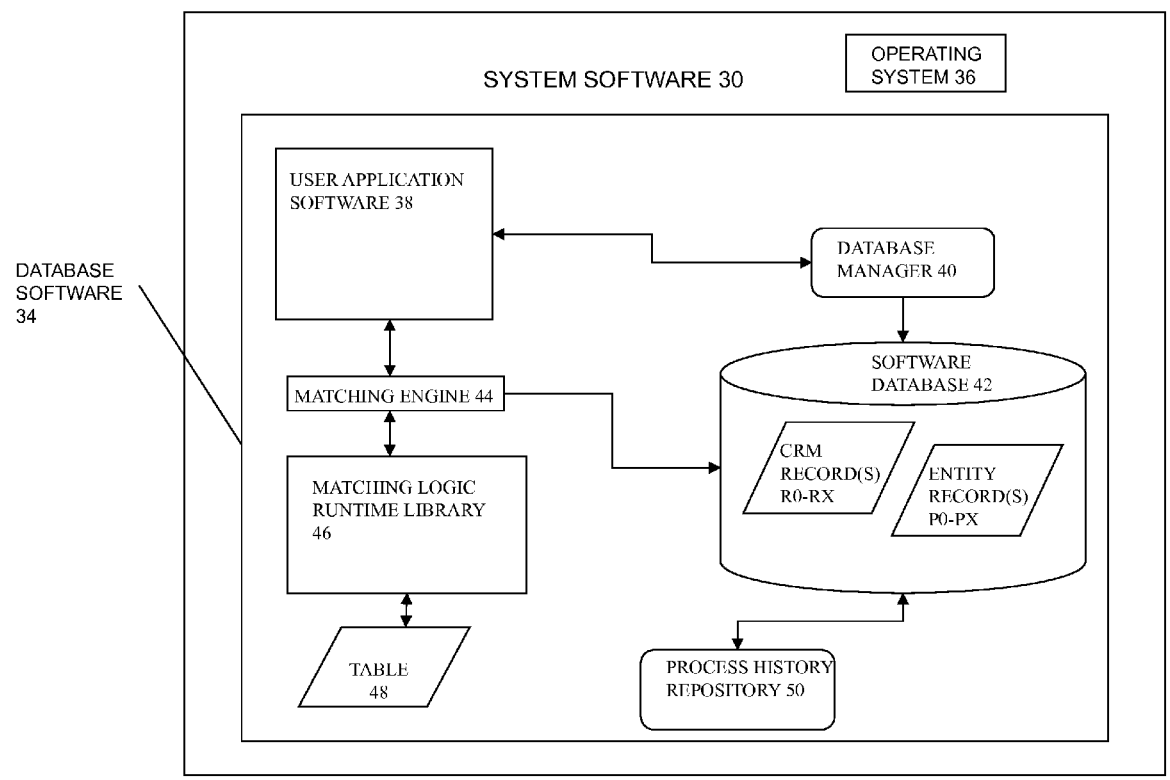
FIG. 3 is a schematic of a system software including a database software that may be comprised within the information technology network of FIG. 1, the computer of FIG. 2, and/or distributed within the computer and the information technology network.

Referring now generally to the Figures and particularly to FIG. 3, FIG. 3 is an entity diagram of a database software 34 of the system software 30 that is maintained on or accessible to the computer 4 and/or the network 2 of FIG. 1. The database software 34 might include in singularity or combination (1.) Salesforce PRM (™) data base software as marketed by Salesforce.com of San Francisco, Calif.; (2.) an object oriented database and an Object Oriented DBMS, (2.) an IBM DB2 Universal Database (™) server (in Linux, UNIX (®)) marketed by IBM Corporation of Armonk, N.Y.; (3.) WINDOWS™ operating system environments marketed by Microsoft Corporation of Redmond, Wash.; and/or (4.) multiple data sources to which the client query application sends queries.

The computer 4 or network 2 may host system software 30 and operating system 36 that includes user application software 38 useful to manage input and output communications between the computer 4, database system 6 and/or workstation 8 hosting the system software 30. A database manager 40 accepts requests, notices, queries, instructions, commands and data from a computer 4, 6, or 8, or the network 2, and thereupon accesses and modifies a software database 42 in compliance with the received requests, notices, queries, instructions, commands and data.

Each CRM record R0-RX is associated with a schema of a software object or other suitable data structure known in the art, whereby an instantiation of a CRM record R0-RX is performed according to a schema associated with the instant CRM record R0-RX. In addition, each entity record P0-PX is associated with a schema software object or other suitable data structure known in the art, whereby an instantiation of an entity record P0-PX is performed according to a schema associated with the instant CRM record R0-RX.

The database manager 40 (hereafter "DBMS") enables commands and queries provided from or sourced by the user application software 38 or a matching engine 44 to be applied to the records R0-RX and the records P0-PX of the software database 42. A matching engine logic 46 directs the matching engine 44 to modify evaluate records R0-RX in accordance with information regarding evaluations stored within a table 48. A process history record of transactions associated with a particular record R of records R0-RX may be maintained in a transaction history repository 50.

Figure 4:
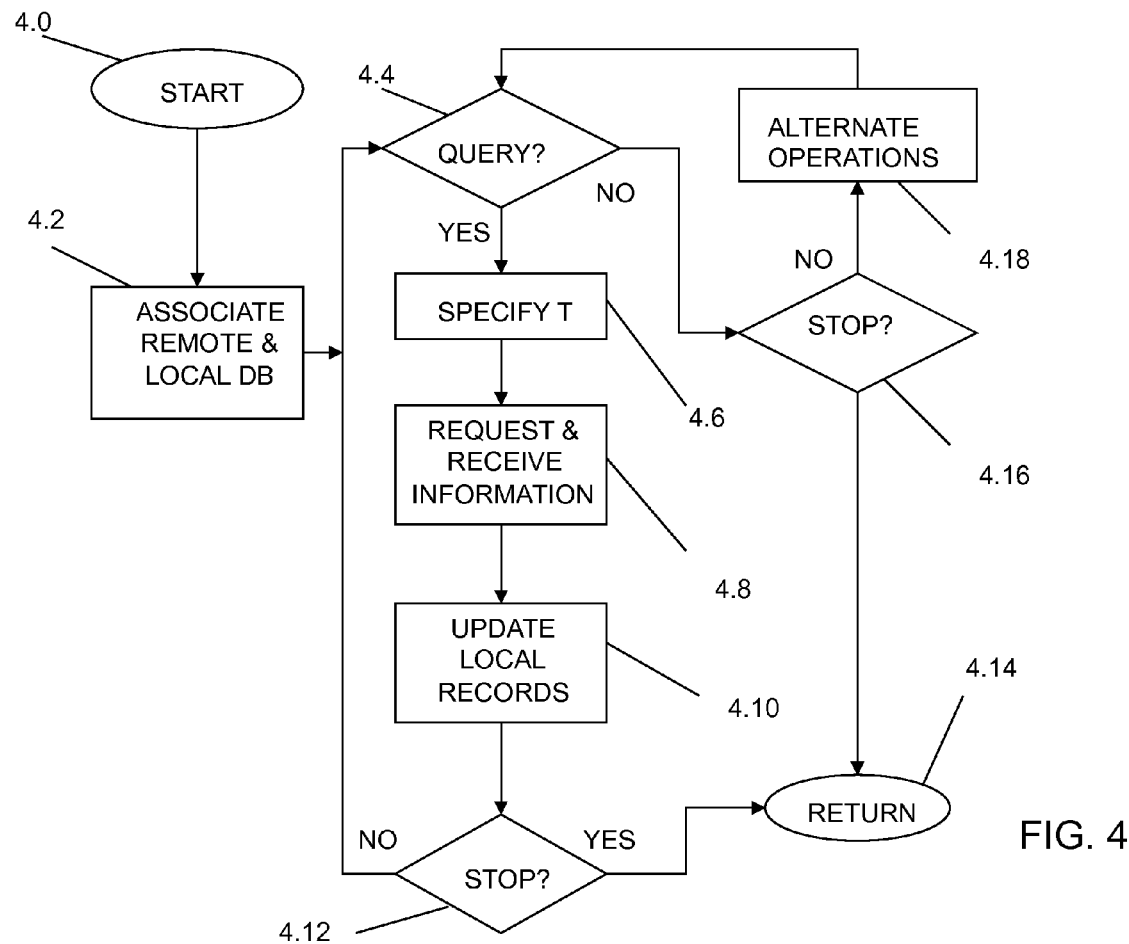
FIG. 4 is a flowchart of the first method that may be implemented by the information technology network of FIG. 1, the computer of FIG. 2.

Referring now generally to the Figures and particularly to FIG. 4, FIG. 4 is a flow chart of the first method as implemented by the network 2 of FIG. 1 and the computer 4 of FIG. 1. The first method, and certain other alternate preferred the method of the present invention, utilize web services metadata to create and maintain consistency of a relational database schema that represents the web services schema. In the first method, when a web service provides a metadata layer, the metadata layer may be translated into a relational database schema. One such commercial example provides a list of objects representing entities in a data model that are linked by common internally generated keys. For each object, an associated application programming interface ("API") provides a list of attributes, including a name of the field, data type, size, scale, precision, access permissions (read or write), methods of incremental retrieval supported, and relationships to other objects in the database. The attribute information provided by the API may provide all the information required to build a relational database schema without any further human intervention in a resulting data structure design.

In step 4.2 the computer 4 in communication with the network 2 associate a locally stored database as a an image of a remotely stored database. In step 4.4 the computer 4 determines whether the local database (hereafter, "local DB"), shall be updated with information updates that have been integrated into the remotely stored database of the network 2 (hereafter, "remote DB"). Where the computer 4 determines to update the local DB, the computer proceeds from step 4.4 to step 4.6 to specify a time period T. The determination by the computer of step 4.4. to update the local DB may be affected (a.) upon request by an operator; (b.) after completion of a certain time period; (c.) or triggered by the detection of a state or condition. The time period T specified in step 4.6 may be established by direction to the computer 4 from an operator or on the basis of an algorithm applied to a history of interactions of the computer 4 and the remote DB. In step 4.8 the computer 4 requests and receives information with which the remote DB has integrated as updating information within the time period T. In step 4.10 the computer 4 update the local DB with the information received from the remote DB in step 4.8. In step 4.12 the computer 4 determines whether to proceed on to other operations, as per step 4.14, or to proceed back to step 4.4. It is understood that the computer 4 may return after executing step 4.14 to steps 4.0, 4.2, or 4.4. When the computer 4 determines in step 4.4 to not execute a local DB update operation as per step 4.6 through step 4.12, the computer 4 may proceed from step 4.4 to step 4.16. The computer 4 determines in step 4.16 to proceed either (a.) on to step 4.14; or (b.) to perform alternate operations in step 4.18 and then to execute step 4.4. In accordance with the first method, often when, or each time that, an object is replicated, the database schema may typically be checked to determine if a corresponding table exists. An object mapping table may contain object names and table names. Each database table may contain a sequence column, a status column, a unique identifier used by the source web services application, a timestamp indicating the last time the record was updated by the web services application, and all the content exposed by the web services API.

Field names may be translated into database column names. If the length of the field name exceeds the limitation of the Data Base Management System (DBMS), the filed name may be truncated to the supported length. If a field name is a reserved word in a list of reserved words provided by the database vendor, an indicator is added or associated with the over-long field name, e.g., "X" may be suffixed to the over-long field name, to prevent problems in column creation. If the field name generated is already used, the last character of the name may be modified from zero to nine (0 to 9) to generate up to 11 unique names. A field mapping table contains object, field, and column names. No metadata about the object data type or attributes is stored because the database always exposes this information in its metadata layer, such as the methods available in JDBC.

Data types in the database may be translated from the API metadata into a basic set of physical data types for string, numeric, date, character large object (CLOB), and binary large object (BLOB) types. Boolean data types are represented as character "true" or "false". The exact database data type depends on the database vendor.

Field lengths of character data may be tripled in the database if an international character set is required, or used exactly as described in the API metadata if a standard character set, e.g., ASCII, is all that is needed. Precision and scale of columns may be calculated using the API metadata. The length, precision, and scale attributes may optionally be checked and potentially corrected by altering the database schema each time the object may be replicated to insure that there is no truncation.

In accordance with the first method, when new objects or fields are created in the web service application, the computer 4 may automatically create corresponding tables and columns. If fields are removed from the web services application, the fields may not be referenced in data copying operations but might not be removed from the schema without human intervention to prevent accidental disruption to users of the relational database.

In accordance with the first method, where all the metadata used to build and maintain the database schema is derived from the web services application and there are no data transformations involved, there may be very little need for an administrative user interface, unless it is to maintain connection information for the database and the web service or various tuning parameters.

The first method enables loading massive amounts of data from the web services application into a relational database. In the prior art, two techniques are employed by the computer 4 to load a table the first time. Since web services typically have much more restrictive performance and reliability characteristics as compared to relational databases housed on internal servers due to Internet latency and bandwidth capacity, it is often important that the initial load of very large tables be both as reliable as possible and restartable.

In accordance with the first method, a first technique involves a "getAll" API interface to load a table the first time and which retrieves all the records of on object in a single pass. This is inherently stable for larger sets of data if the process produces an unordered list because there is no intermediate restart capability. If the load fails, it must be restarted from the beginning Records are added to the database as a "blind insert." If the DBMS returns a duplicate key condition and rejects the insert, the records are updated using the unique key as a search condition. In this fashion we are able to load small or intermediate size tables.

Further in accordance with the first method, a second technique is provided for the benefit of very large tables where the API "getAll" technique either takes so long that the network or system stability over a very long time jeopardizes the likelihood of a successful load, or the query is timed out by the web service API. This second technique involves a series of queries by time range, where the initial time is determined by some automated process as the earliest possible record change date. The interval size is set in a configuration to a period of time that is large enough not to force unnecessary numbers of queries, yet small enough to be restartable in the event of failure. This time interval could be several days, but could also be set to several minutes if there was a massive update at one point of many records in the web service application. A sophisticated heuristic may also be employed to automatically length or shorten the intervals, depending on whether too many or not enough records are returned in a typical span of time, but this can also be manually adjusted if problems arise. It is of course important that the field used to determine the update date of the record by rigorously maintained by the web service application, and should also be indexed for performance.

The first method further optionally includes a method of copying new, changed, or deleted data in the web services application to the relational database. In accordance with the first method, implementations of incremental data retrieval may include one or more of the following aspects:

get by ID—retrieve records by a list of unique identifiers. Used primarily for unit testing of integration code or database triggers
  get by Query—retrieve records based on some condition of the data. This has applications for testing of integration code or database triggers.
  get by time stamp—used for synchronizing web service data changes to the database There may be metadata stored in a database table that includes the time range selected, the object being selected, record counts, and a status that will be checked. The most recent end time for an object where the status was successful shall determine the start time of the next query time frame. Allowances shall be made for clock variances by checking the clock at the web service provider against the local database, and also for time zone differences.

The first method further optionally or alternatively includes a method of copying new, changed, or deleted data from the relational database to the web services application. One technique for sending data to the web service. Each table chosen to participate in the integration will be checked, wherein:

New records may be signified with a status flag that indicates it is a new record.
  Records to be updated may be signified by an "update" status flag or a timestamp that is newer than the most recent download time.

Records to be deleted may be signified by a status of "delete" instead of being physically deleted. The record status may be changed to "is deleted" after the successful deletion from the web service.

In accordance with the first method, XML buffers may be built for added, modified, or deleted records. The success of the operation may be checked and recorded in the record in the database. New records may have their new identifier keys populated as they are created by the web service. If the web service returns all the fields updated, including time stamps and other information, these updates may be posted to the database at this time. Otherwise, another timestamp-based retrieval may be necessary to complete the process.

Figure 5:
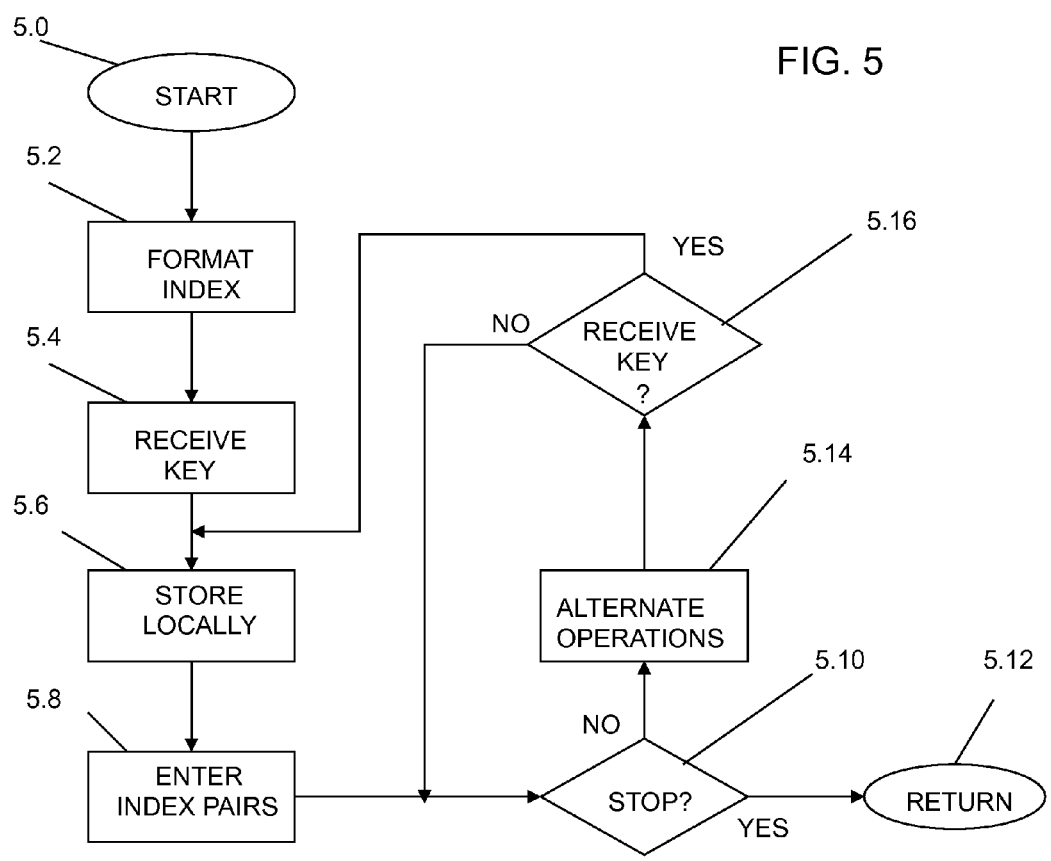
FIG. 5 is a flowchart of the second method that may be implemented by the information technology network of FIG. 1, the computer of FIG. 2.

Referring now generally to the Figures and particularly FIG. 5, the second method enables managing a relational database for use by a reporting system. It is understood that in the prior art a reporting system may record which records are active or logically deleted and that the noting of this status of a record may be accomplished by an update status flag.

In step 5.2 the computer 4 formats a software index, the index designed to maintain a plurality of pairs, each pair for storing a foreign key received from the remote DB and a local memory address of where the foreign key is stored within the computer 4. In step 5.4 the computer 4 receives information including a foreign key of a record from the remote DB. In step 5.6 the computer 4 stores the information received in step 5.4. In step 5.8 the computer 4 enters a pair into the index of step 5.2, wherein the entered pair comprises the foreign key received in step 5.4 and the memory location of a record as stored in the local DB, wherein the instant record is the record referred to by the foreign key of step 5.4. The computer 4 determines in step 5.10 to proceed either (a.) proceed to step 5.12 to return to other operations; or (b.) to perform alternate operations in step 5.14 and then to execute step 5.16. In step 5.16 the computer 4 determines whether an instance of receipt of an indexed foreign key has not been stored in the local DB. When the computer determines in step 5.16 that an additional instance of receipt of a foreign key reference has not been entered into the index formatted in step 5.2, the computer 4 proceeds on to step 5.6. Alternatively, the computer 4 may proceed from step 5.16 to execute step 5.10. It is understood that the computer 4 may return after executing step 5.12 to execute step 5.0, step 5.2, or step 5.4.

Further in accordance with the second method, performance indexes on foreign key fields may be built where feasible. If the logical relationships are exposed by the web service metadata, non-unique performance indexes may be built if the user of the computer 4 requests. Physical foreign key relationships may be built, and might optionally only be built if:

the information is available in the web service metadata;
the relationships can be implemented in the DBMS using standard foreign keys;
this may not be possible of a child field can point to two different parent tables); and/or
records will not be created external to the web service application; foreign key relationships are not feasible of the keys are changed during creation of the records in the web service.

Figure 6:
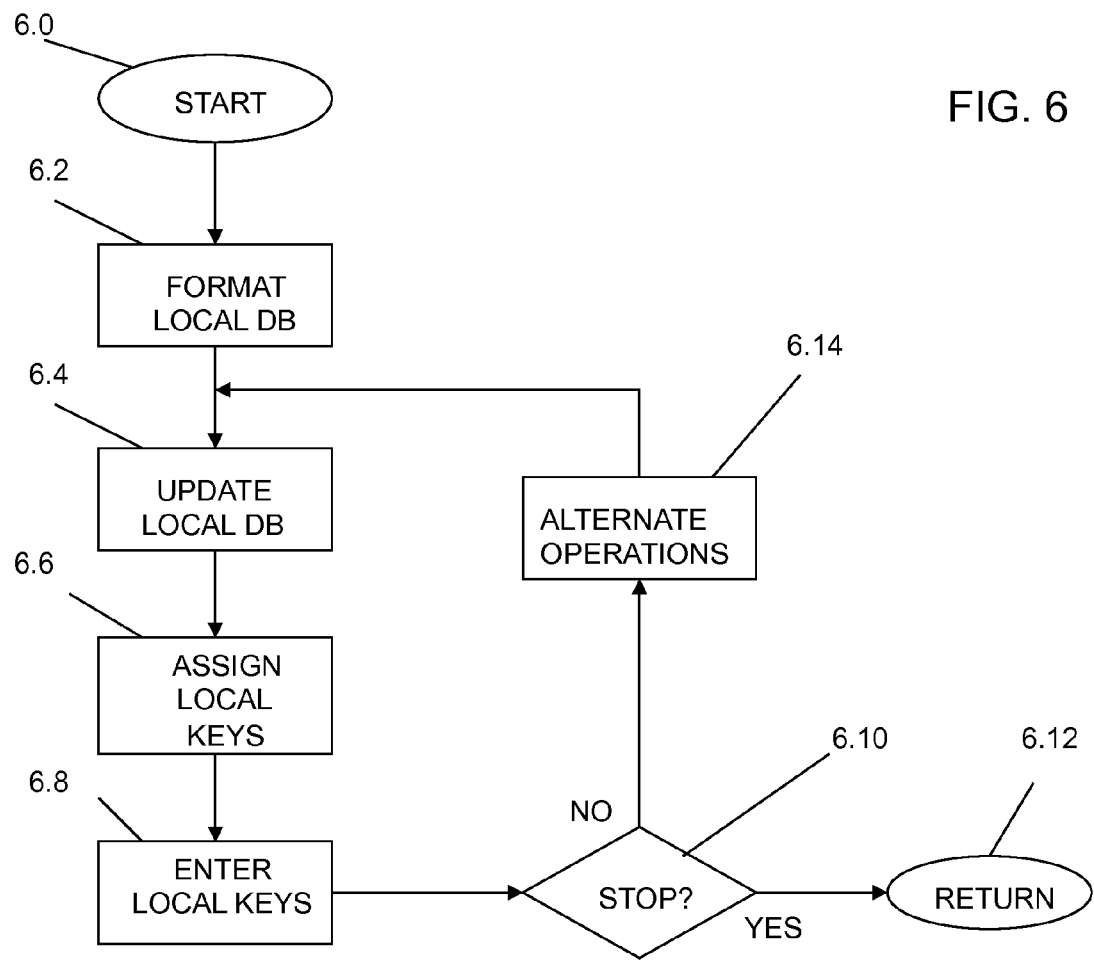
FIG. 6 is a flowchart of the third method that may be implemented by the information technology network of FIG. 1, the computer of FIG. 2.

Referring now generally to the Figures and particularly FIG. 6, the third method enables methods of integrating other applications with the web services application. In step 6.2 the local DB is formatted to accept records from the remote DB. In step 6.4 the local DB is updated with information (a.) received from the remote DB; (b.) provided by an operator; and/or (c.) information uploaded or downloaded via the network 2 or from a computer-readable medium. In step 6.6 the computer 4 assigns local keys to records stored in the local DB and referenced by the records or other information received in step 6.4. In step 6.8 the local keys are inserted in the local DB to replace the foreign key references. The computer 4 determines in step 6.10 to proceed either (a.) on to step 6.12 to return to other operations; or (b.) to perform alternate operations in step 6.14 and then to execute step 6.4. It is understood that the computer 4 may return after executing step 6.12 to execute step 6.0, step 6.2, or step 6.4.

The third method may employ certain techniques that are the same whether an initial load of legacy data is being performed or ongoing integration is being performed on two applications. The third method may include one or more of the following aspects:

Creating the schema using the system to automatically build all the tables;
Creating legacy primary keys for each table you are converting or integrating with any database administration tool. The size of the field should be at least as large as the source system's primary key. This key should typically not be exposed to web service because cloning records in the web service application will cause a unique index violation when the key values are cloned;
Creating database triggers to maintain default values on each table that will be loaded or integrated to populate default values into certain fields, including the unique indexes;
Populating the top table in the hierarchy and ensuring that required fields are populated or defaulted;
Loading the top table in the hierarchy to the web service application, which may cause the primary key to be replaced by the primary key from the web service;
A database update trigger updating the foreign key fields in some or any child tables to point to the new parent key where the values are equal to the parent's temporary key; and
Loading the remaining tables to the web service application.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible embodiments of the Present Invention. The examples given should only be interpreted as illustrations of some of the preferred embodiments of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the Present Invention as disclosed and claimed should, therefore, be determined with reference to the knowledge of one skilled in the art and in light of the disclosures presented above.

We claim:

1. A computer implemented method for integrating a computer network service application with a local database of a client computer, the method comprising:
a) generating a new child record in a local database of the client computer with a temporary relationship value in at least one internal relationship data field of the new child record such that the new child record is logically related to a parent record of a DBMS of the computer network by virtue of having the same temporary relationship value in the at least one internal relationship data field of the new child record;

b) detecting a changed value of a key of the parent record as maintained by the network service application;

c) selecting the new child record on the criterion of the new child record having at least one internal relationship data field that is internal to the selected new child record and that identifies the parent record;

d) writing the changed value of the key of the parent record into the internal relationship data field of the new child record; and e) directing the client computer to update the values of internal relationship data fields in related records of the local database using database triggers to detect changes in the key of the parent record as communicated by the network service application.

2. The computer implemented method of claim 1, wherein the DBMS executes an automatic local database update by communicating with a web service of the communications network.

3. The computer implemented method of claim 1, wherein the communications network is selected from the group consisting of the Internet and an intranet database management system.

4. The computer implemented method of claim 1, wherein the DBMS comprises a relational database.

5. The computer implemented method of claim 4, wherein the DBMS comprises at least two tables.

\* \* \* \* \*